(12) United States Patent
Wada (10) Patent No.: US 9,936,137 B2
(45) Date of Patent: Apr. 3, 2018

(54) DISPLAY CONTROL APPARATUS, METHOD FOR CONTROLLING THE SAME, AND STORAGE MEDIUM

(71) Applicant: CANON KABUSHIKI KAISHA, Tokyo (JP)

(72) Inventor: Takayuki Wada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 15/007,800

(22) Filed: Jan. 27, 2016

(65) Prior Publication Data

US 2016/0227122 A1    Aug. 4, 2016

(30) Foreign Application Priority Data

Jan. 30, 2015   (JP) .................................. 2015-017291

(51) Int. Cl.
*H04N 5/222*    (2006.01)
*H04N 5/232*    (2006.01)

(52) U.S. Cl.
CPC ..... *H04N 5/23293* (2013.01); *H04N 5/23241* (2013.01); *H04N 5/23245* (2013.01)

(58) Field of Classification Search
CPC ............ G06F 1/3265; G09G 2330/027; H04N 5/23241; H04N 5/23293
See application file for complete search history.

(56) References Cited

U.S. PATENT DOCUMENTS

2010/0066888 A1* 3/2010 Nakai ...................... G03B 7/26
                                                    348/333.01
2014/0293109 A1* 10/2014 Kobayashi ......... H04N 5/23293
                                                    348/333.02

FOREIGN PATENT DOCUMENTS

JP              10-004509 A        1/1998

* cited by examiner

*Primary Examiner* — Daniel M. Pasiewicz
*Assistant Examiner* — Selam Gebriel
(74) *Attorney, Agent, or Firm* — Canon U.S.A., Inc. IP Division (57) ABSTRACT

A display control apparatus includes a viewfinder including an eye contacting portion and an internal display unit, an eye approaching detection unit, a mode switching unit which selects one of a plurality of operation modes including first and second operation modes, and a control unit which performs control such that an on state of the internal display unit is changed to an off state based on detection, by the eye approaching detection unit, of an object which moves away from the eye contacting portion to a position at or further than a first distance from the eye contacting portion in the first operation mode, and the on state is changed to the off state based on detection, by the eye approaching detection unit, of an object which moves away from the eye contacting portion to a position at or further than a second distance, which is larger than the first distance, from the eye contacting portion in the second operation mode.

23 Claims, 5 Drawing Sheets

DISPLAY CONTROL APPARATUS, METHOD FOR CONTROLLING THE SAME, AND STORAGE MEDIUM

BACKGROUND OF THE INVENTION

Field of the Invention

The present invention relates to a display control apparatus, a method for controlling the display control apparatus, and a storage medium, and particularly relates to a technique of controlling display by a display member included in an eyepiece finder.

Description of the Related Art

In recent years, digital still cameras including a finder in addition to an external display device have been widely used. Examples of such digital still cameras include digital still cameras having an optical finder and digital still cameras having an electronic viewfinder (hereinafter referred to as an "EVF").

The EVF is capable of displaying an image captured by an imaging element in real time, and therefore, is conveniently used to check an actually captured image. However, the EVF has a disadvantage in that, if a liquid crystal panel using backlight as lighting is used, power consumption is large. Furthermore, if an organic electroluminescence (EL) panel is used, burn-in or aging degradation occurs if display is performed for a long period of time. Note that many optical finders also incorporate a display member for displaying information.

Japanese Patent Laid-Open No. 10-4509 discloses a method for enabling display of an EVF display monitor when contacting of a user's eye is detected by an eye-contacting detector included in an EVF and disabling display of the EVF when contacting of the user's eye is not detected. By this, power consumption of backlight is reduced so that power saving is attained, and furthermore, the burn-in and the aging degradation are suppressed. However, in the related art described above, a display portion in the EVF is blacked out when a user's eye is separated from the EVF for a short time, and a long period of time is required for energization when the eye is brought into contact with the EVF again resulting in poor usability.

SUMMARY OF THE INVENTION

The present invention suppresses poor usability and uncomfortableness for a user in a display operation in a display unit included in a finder performed in accordance with an eye approaching operation and an eye separating operation of the user while power consumption is suppressed.

According to an embodiment of the present invention, there is provided a display control apparatus including a viewfinder including an eye contacting portion and an internal display unit, an eye approaching detection unit configured to detect a distance to an object approaching the eye contacting portion, a mode switching unit configured to select one of a plurality of operation modes including first and second operation modes, and a control unit configured to perform control such that an on state of the internal display unit is changed to an off state based on detection, by the eye approaching detection unit, of an object which moves away from the eye contacting portion to a position at or further than a first distance from the eye contacting portion in the first operation mode, and the on state of the internal display unit is changed to the off state based on detection, by the eye approaching detection unit, of an object which moves away from the eye contacting portion to a position at or further than a second distance, which is larger than the first distance, from the eye contacting portion in the second operation mode.

According to another embodiment of the present invention, there is provided a display control apparatus including a viewfinder including an eye contacting portion and an internal display unit, an eye approaching detection unit configured to detect approach of an object to the eye contacting portion, a mode switching unit configured to select one of a plurality of operation modes including first and second operation modes, and a control unit configured to perform control such that an on state of the internal display unit is changed to an off state when a first time has elapsed after the eye approaching detection unit does not detect the object in the vicinity of the eye contacting portion any more in the first operation mode, and the on state of the internal display unit is changed to the off state when a second time which is longer than the first time has elapsed after the eye approaching detection unit does not detect the object in the vicinity of the eye contacting portion any more in the second operation mode.

According to still another embodiment of the present invention, there is provided a display control apparatus including a viewfinder including an eye contacting portion and an internal display unit, an eye approaching detection unit configured to detect a distance to an object approaching the eye contacting portion, a remaining amount detection unit configured to detect a battery remaining amount, and a control unit configured to perform control such that in a case where the battery remaining amount detected by the remaining amount detection unit is smaller than a predetermined value, an on state of the internal display unit is changed to an off state based on detection, by the eye approaching detection unit, of an object which moves away from the eye contacting portion to a position at or further than a first distance from the eye contacting portion, and in a case where the battery remaining amount detected by the remaining amount detection unit is equal to or larger than the predetermined value, the on state of the internal display unit is changed to the off state based on detection, by the eye approaching detection unit, of an object which moves away from the eye contacting portion to a position at or further than a second distance, which is larger than the first distance, from the eye contacting portion.

According to a further embodiment of the present invention, there is provided a display control apparatus including a viewfinder including an eye contacting portion and an internal display unit, an eye approaching detection unit configured to detect approach of an object to the eye contacting portion, a remaining amount detection unit configured to detect a battery remaining amount, and a control unit configured to perform control such that in a case where the battery remaining amount detected by the remaining amount detection unit is smaller than a predetermined value, an on state of the internal display unit is changed to an off state when a first time has elapsed after the eye approaching detection unit does not detect the object in the vicinity of the eye contacting portion any more, and in a case where the battery remaining amount detected by the remaining amount detection unit is equal to or larger than the predetermined value, the on state of the internal display unit is changed to the off state when a second time which is longer than the first time has elapsed after the eye approaching detection unit does not detect the object in the vicinity of the eye contacting portion any more.

Further features of the present invention will become apparent from the following description of exemplary embodiments with reference to the attached drawings.

DESCRIPTION OF THE EMBODIMENTS

Embodiments of the present invention will be described in detail below with reference to the accompanying drawings.

It is to be noted that the following embodiments are merely examples for implementing the present invention and can be appropriately modified or changed depending on individual constructions and various conditions of apparatuses to which the present invention is applied. Thus, the present invention is in no way limited to the following embodiments. Each of the embodiments of the present invention described below can be implemented solely or as a combination of a plurality of the embodiments or features thereof where necessary or where the combination of elements or features from individual embodiments in a single embodiment is beneficial.

First Embodiment

A configuration of an imaging apparatus according to a first embodiment of the present invention will be described hereinafter.

Figure 2:
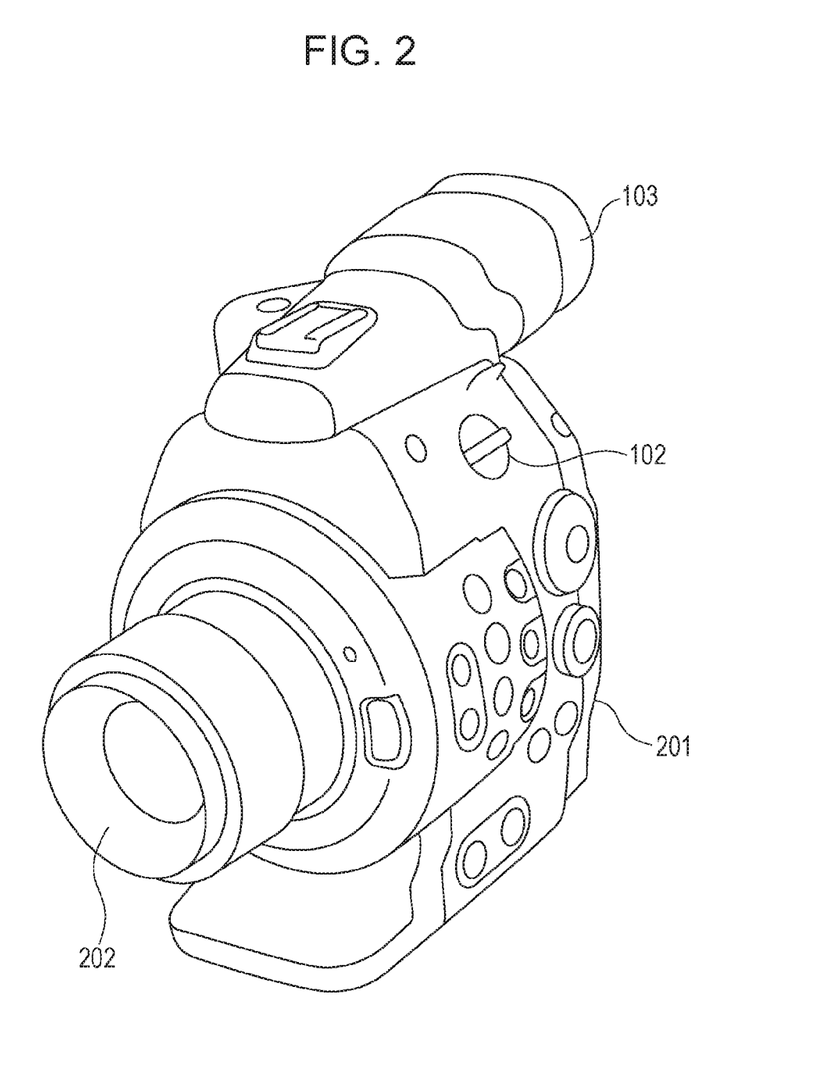
FIG. 2 is a perspective view illustrating appearance of the configuration of the imaging apparatus.

FIG. 2 is a perspective view illustrating appearance of the configuration of the imaging apparatus according to the embodiment.

In FIG. 2, a reference numeral 201 denotes a body of a video camera, 202 denotes a lens, 102 denotes a power/mode switch, and 103 denotes an EVF.

The video camera according to the first embodiment includes the lens 202 in a front portion of the camera body 201 and the EVF 103 incorporating a display unit in a rear portion of the camera body 201. Furthermore, a battery, not illustrated, may be attached to the rear portion. Specifically, the EVF 103 is constituted by an organic EL panel capable of displaying reproduced video images and captured video images and a proximity sensor, not illustrated, disposed in an eye contacting portion of the EVF 103.

The power/mode switch 102 performs an on/off operation of power of the camera body 201 and selects one of a plurality of operation modes including a recording mode and a reproducing mode.

Next, a configuration of system control of the imaging apparatus according to the first embodiment will be described.

Figure 1:
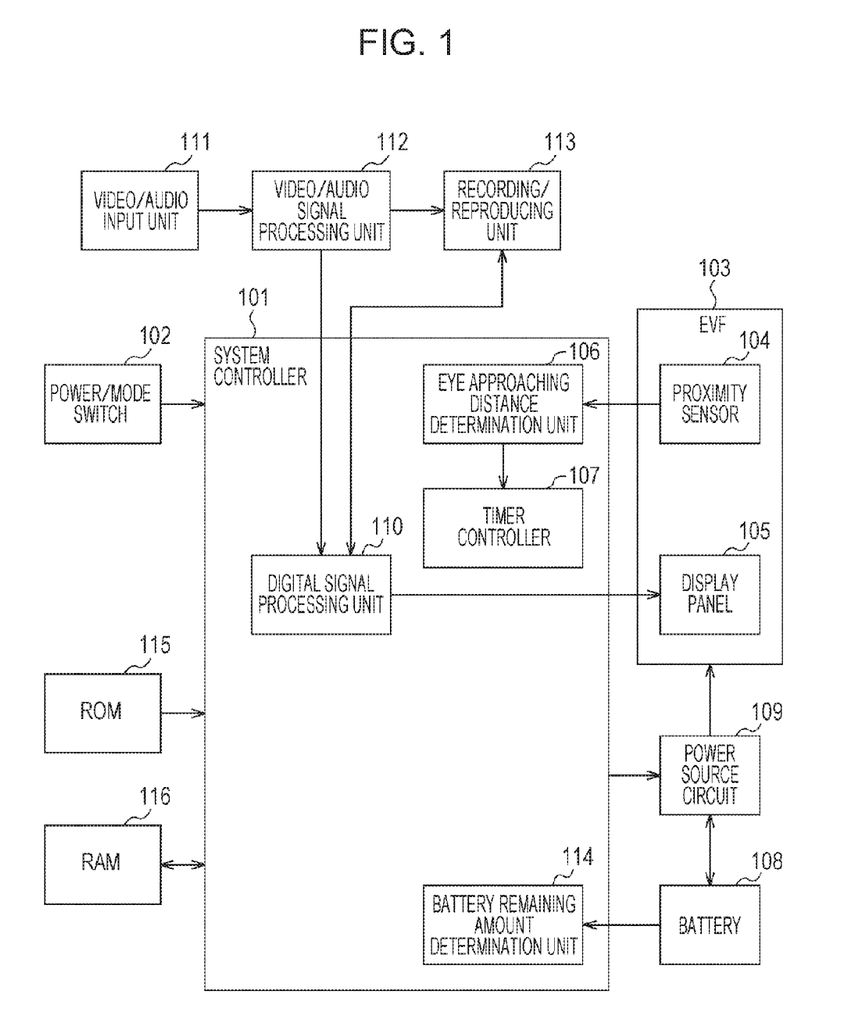
FIG. 1 is a block diagram illustrating a configuration of an imaging apparatus.

FIG. 1 is a block diagram illustrating the configuration of the system control of the imaging apparatus according to the first embodiment.

As illustrated in FIG. 1, the imaging apparatus of the first embodiment includes a video/audio signal processing unit 112 which performs required signal processing on data of an image captured by a video/audio input unit 111 and a recording/reproducing unit 113 which records and reproduces the image data which has been subjected to the signal processing. Furthermore, the video/audio signal processing unit 112 includes an imaging element and an A/D converter (not illustrated).

A system controller 101 connected to the EVF 103 controls output of an image to be displayed in a display panel 105 which performs internal display. The display panel 105 is a display unit included in the finder and is constituted by a liquid crystal panel or an organic EL panel. A user may observe the display in the display panel 105 by bringing an eye into contact with the EVF 103. Furthermore, the system controller 101 connected to a power supply circuit 109 performs power control of the EVF 103.

Furthermore, the system controller 101 further connected to a proximity sensor 104 included in the EVF 103 detects an eye approaching distance of the EVF 103. An infrared proximity sensor, for example, may be used as the proximity sensor 104 which detects approach of an object to an eye contacting portion of the EVF 103.

When an object approaches the eye contacting portion, infrared light emitted from a light emitting unit (not illustrated) included in the proximity sensor 104 is reflected and received by a light receiving unit (not illustrated) included in the infrared light proximity sensor 104. A distance between the object and the eye contacting portion (an eye approaching distance) may be determined in accordance with an amount of the received infrared light. In this way, the proximity sensor 104 performs eye approaching detection for detecting an approaching distance of the object to the eye contacting portion. Note that the infrared proximity sensor is merely an example, and other sensors may be employed as the proximity sensor 104 as long as approach seen to be approach of the user's eye and a distance to an object estimated as the eye or a face of the user at a time of the approach may be detected. Furthermore, the power/mode switch 102 described above is connected to the system controller 101.

The system controller 101 includes an eye approaching distance determination unit 106 and a timer controller 107. The eye approaching distance determination unit 106 determines whether an eye approaching distance detected by the proximity sensor 104 is smaller or larger than a threshold value. The timer controller 107 controls a period of time from when the EVF 103 is turned on to when the EVF 103 is turned off. The system controller 101 further includes a digital signal processing unit 110.

The digital signal processing unit 110 performs format conversion and a resizing process on a video signal supplied from the video/audio signal processing unit 112 so that the video signal is suitable for the connected recording/reproducing unit 113 and the connected EVF 103 and performs a process of adding metadata on a video image to be recorded in the recording/reproducing unit 113.

Furthermore, a battery 108 is connected to the system controller 101. The battery 108 connected to the power supply circuit 109 performs power supply and charging control. Furthermore, the system controller 101 including a battery remaining amount determination unit 114 performs detection of a remaining amount of the battery 108 and determines whether the battery remaining amount is smaller than a predetermined value or equal to or larger than the predetermined value.

A ROM 115 is an electrically removable and recordable nonvolatile memory, and records computer programs used to control operations of the units included in the imaging apparatus and information on parameters and the like associated with the operations of the units.

A RAM 116 is a volatile memory executed as a working area used by the system controller 101 to execute a program.

Note that the eye approaching distance determination unit 106, the timer controller 107, the digital signal processing unit 110, and the battery remaining amount determination unit 114 are functional modules (software) realized by the system controller 101. In this embodiment, they are realized when a processing unit (CPU) of the system controller 101 executes programs. They may be configured as dedicated circuits (hardware).

Operation in the first embodiment will be described with reference to a flowchart and a drawing hereinafter.

Figure 3:
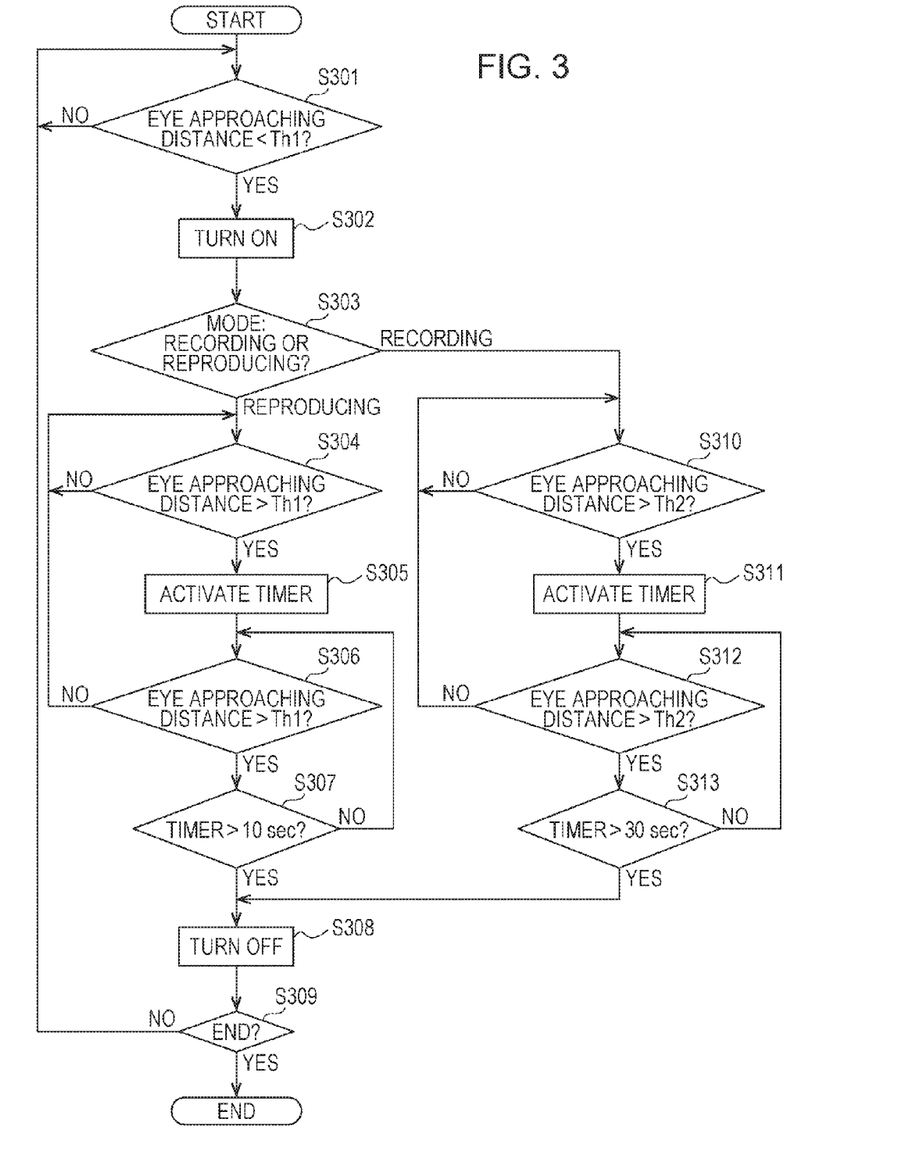
FIG. 3 is a flowchart illustrating operation of the imaging apparatus according to the first embodiment.

FIG. 3 is a flowchart illustrating the operation of the imaging apparatus according to the first embodiment. This process is realized when the system controller 101 reads a program stored in the ROM 115 to the RAM 116 and executes the program.

In FIG. 3, when power is supplied from the power/mode switch 102, the system controller 101 determines whether an eye approaching distance detected by the proximity sensor 104 of the EVF 103 is smaller than a threshold value Th1 (a threshold value 1) in step S301.

Figure 4:
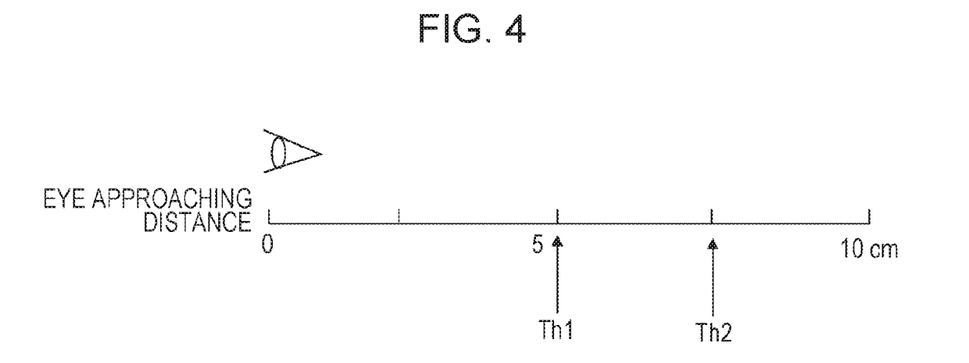
FIG. 4 is a diagram illustrating threshold values of an eye approaching distance.

Examples of threshold values of the eye approaching distance will be described with reference to FIG. 4.

It is assumed that an eye approaching distance of 7.5 cm is determined as a second distance and a threshold value Th2. It is further assumed that an eye approaching distance of 5.0 cm which is smaller than the threshold value Th2 is determined as a first distance and the threshold value Th1. When the eye approaching distance is not smaller than the threshold value Th1, the operation in step S301 is performed again. On the other hand, when the eye approaching distance is smaller than the threshold value Th1, the process proceeds to step S302.

In step S302, the system controller 101 turns on the display panel 105. By this, a video image (a live view image) supplied from the video/audio input unit 111 is displayed in the recording mode whereas an image (a moving image or a still image) recorded in the recording/reproducing unit 113 is displayed in the reproducing mode.

In step S303, the system controller 101 determines whether the recording mode is operated or the reproducing mode is operated in accordance with information included in the power/mode switch 102. In a case of the reproducing mode, the process proceeds to step S304. In a case of the recording mode (an imaging mode), the process proceeds to step S310.

In step S304, the system controller 101 determines whether an eye approaching distance is larger than the threshold value Th1. When the eye approaching distance is larger than the threshold value Th1, the process proceeds to step S305. When the eye approaching distance is equal to or smaller than the threshold value Th1, the operation in step S304 is performed again.

In step S305, the system controller 101 starts time keeping, that is, time measurement, using the timer controller 107.

In step S306, the system controller 101 determines whether the eye approaching distance is larger than the threshold value Th1 (that is, the eye approaching distance is still larger than the threshold value Th1 after step S304). When the eye approaching distance is larger than the threshold value Th1, the process proceeds to step S307. When the eye approaching distance is equal to or smaller than the threshold value Th1 (that is, the eye approaching distance becomes larger than the threshold value Th1 once but the distance is reduced to be equal to or smaller than the threshold value Th1 within 10 seconds), the process returns to step S304.

In step S307, the system controller 101 determines whether a measurement time measured by the timer controller 107 is larger than 10 seconds (that is, whether 10 seconds has elapsed after the eye approaching distance becomes larger than the threshold value Th1 in step S304). When the measurement time is larger than 10 seconds (that is, 10 seconds has elapsed), the process proceeds to step S308. When the measurement time is equal to or smaller than 10 seconds, the process returns to step S306.

In step S308, the system controller 101 turns off the display panel 105 so as to enter a non-display state. By this, power consumption, burn-in, and aging degradation may be suppressed.

In step S309, the system controller 101 determines whether a termination event, such as turning off of power, has been performed. When it is determined that the termination event has been performed, the process is terminated whereas when it is determined that the termination event has not been performed, the process returns to step S301 and the process from step S301 onwards is performed again. When the process is not to be terminated and when an eye approaching within the predetermined distance, that is, within the threshold value Th1, is detected, the display panel 105 is turned on and display is performed again.

In step S310, the system controller 101 determines whether the eye approaching distance is larger than the threshold value Th2. When the eye approaching distance is larger than the threshold value Th2, the process proceeds to step S311. When the eye approaching distance is equal to or smaller than the threshold value Th2, the operation in step S310 is performed again.

In step S311, the system controller 101 starts time measurement using the timer controller 107.

In step S312, the system controller 101 determines whether the eye approaching distance is larger than the threshold value Th2 (that is, the eye approaching distance is still larger than the threshold value Th2 after step S310). When the eye approaching distance is larger than the threshold value Th2, the process proceeds to step S313. When the eye approaching distance is equal to or smaller than the threshold value Th2 (that is, the eye approaching distance becomes larger than the threshold value Th2 once but the distance is reduced to be equal to or smaller than the threshold value Th2 within 30 seconds), the process returns to step S310.

In step S313, the system controller 101 determines whether a measurement time measured by the timer controller 107 is larger than 30 seconds (that is, whether 30 seconds has been elapsed after the eye approaching distance becomes larger than the threshold value Th2 in step S310). When the measurement time is larger than 30 seconds, the process proceeds to step S308 where the display panel 105 is turned off. When the measurement time is equal to or smaller than 30 seconds, the process returns to step S312.

As described above, in the reproducing mode, the time measurement is started when it is determined that the object which approached the eye contacting portion moves away from the eye contacting portion by the first distance or more, and the display panel 105 is turned off when a first time period has elapsed. Furthermore, in the recording mode, the time measurement is started when it is determined that the object which approached the eye contacting portion moves away from the eye contacting portion by the second distance or more, and the display panel 105 is turned off when a second time period has elapsed.

According to this embodiment, different eye approaching distances cause turning off of the EVF 103 and different periods of time before the EVF 103 is turned off are employed in the reproducing mode and the recording mode; the larger eye approaching distance which causes turning off of the EVF 103 and the longer period of time before the EVF 103 is turned off are attained in the recording mode. By this, the EVF 103 is not turned off if the user's eye moves away for a short time during image capturing, and accordingly, imaging is not disturbed, unnecessary power consumption of the EVF 103, burn-in, and aging degradation may be suppressed by proximity detection control.

More specifically, the threshold value (Th1) of the eye approaching distance in step S304 and the threshold value (Th2) of the eye approaching distance in step S310 are different from each other, that is, the threshold value Th2 is larger than the threshold value Th1. In other words, the threshold value for the eye approaching distance in the recording mode is larger than that in the reproducing mode. By this, in the recording mode, the display panel 105 is not easily turned off even if the eye moves more largely away from the EVF 103 when compared with the reproducing mode.

This is because, in the recording mode, it is likely that an operation of checking a video image through the EVF 103 and an operation of checking the subject by the naked eye with a certain distance from the EVF 103 are alternately performed. Furthermore, even if the subject is not checked by the naked eye, it is likely that the eye unintentionally moves away from the EVF 103 while the imaging apparatus body is moved for framing.

Since there are such possibilities in the recording mode, if turning on and turning off of the display panel 105 included in the EVF 103 are frequently performed in a repetitive manner when the eye moves away from the EVF 103 by a small distance, the user may feel uncomfortableness of flicker or the user may not quickly check the video image due to delay of the operation of turning on or turning off. This causes loss of shooting opportunity. On the other hand, in this embodiment, occurrence of such problems is suppressed since the threshold value for the eye approaching distance for turning off of the display panel 105 in the recording mode is larger than that in the reproducing mode.

Furthermore, a period of time of the timer from when the eye moves away to when the display panel 105 is turned off in the recording mode in step S313 (30 seconds) and that in the reproducing mode in step S307 (10 seconds) are different from each other, that is, the period of time in the recording mode is longer than that in the reproducing mode. By this, the display panel 105 is not easily turned off in the recording mode according to the reason described above.

Note that, in this embodiment, the case where the threshold values (Th1 and Th2) of the eye approaching distance are differentiated and the timer times (10 seconds and 30 seconds) from when the eye contacting threshold value is exceeded to when the display panel 105 is turned off are differentiated has been described. However, only one of the two elements may be differentiated. Specifically, one of the threshold values of the eye approaching distance and the timer times may be differentiated so that the display panel 105 is not easily turned off in the recording mode and the other of the threshold values of the eye approaching distance and the timer times may not be differentiated.

Furthermore, in this embodiment, the eye approaching distances which cause the turning off of the display panel 105 are differentiated and the periods of time before the display panel 105 is turned off are differentiated between the reproducing mode and the recording mode. However, the eye approaching distances may be differentiated and the periods of time before the display panel 105 is turned off may be differentiated after it is determined whether recording is being performed. In this case, the display panel 105 is not easily turned off during the recording. Alternatively, at least eye approaching distances or periods of time before the display panel 105 is turned off may be differentiated among the reproducing mode, a recording waiting state in the recording mode, and a recording state in the recording mode. In this case, an order of modes in terms of difficulty of turning off of the display panel 105 is described as follows: the recording state in the recording mode, the recording waiting state in the recording mode, and the reproducing mode.

The operation modes described above are merely examples, and difficulty levels of the turning off of the display panel 105 after the eye moves away from the EVF 103 may be differentiated among other modes by controlling threshold values taking usage in the operation modes into consideration.

Although the control associated with the turning off of the display panel 105 included in the EVF 103 has been described in the foregoing example, the present invention is applicable to a display member (such as a liquid crystal display member) for displaying information inside an optical finder.

Second Embodiment

Hereinafter, a configuration of an imaging apparatus according to a second embodiment of the present invention will be described. The configuration of the imaging apparatus and a system configuration according to the second embodiment of the present invention are the same as those of the first embodiment (FIGS. 1 and 2), and therefore, descriptions thereof are omitted.

Operation of the second embodiment will be described with reference to a flowchart hereinafter.

Figure 5:
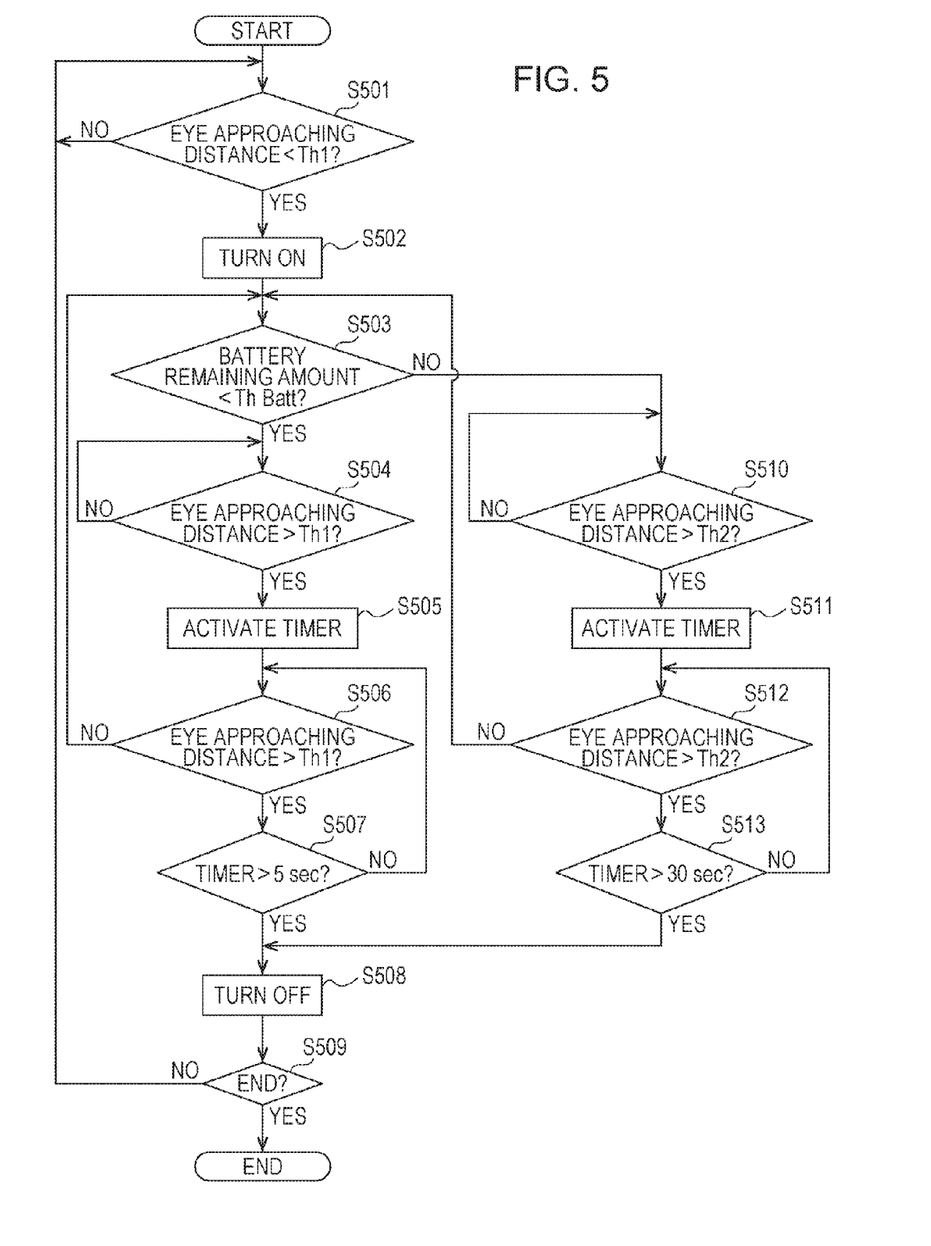
FIG. 5 is a flowchart illustrating operation of an imaging apparatus according to a second embodiment.

FIG. 5 is a flowchart illustrating operation of the imaging apparatus according to the second embodiment. This process is realized when a system controller 101 reads a program stored in a ROM 115 to a RAM 116 and executes the program.

In FIG. 5, when power is supplied from a power/mode switch 102, the system controller 101 determines whether an eye approaching distance detected by a proximity sensor 104 of an EVF 103 is smaller than a threshold value Th1 (a threshold value 1) in step S501. Threshold values of the eye approaching distance are the same as those illustrated in FIG. 4.

When the eye approaching distance is not smaller than the threshold value Th1, the operation in step S501 is performed again. On the other hand, the eye approaching distance is smaller than the threshold value Th1, the process proceeds to step S502.

In step S502, the system controller 101 turns on a display panel 105.

In step S503, the system controller 101 determines whether a battery remaining amount is smaller than an arbitrary threshold value in accordance with information included in a battery remaining amount determination unit 114. When the battery remaining amount is smaller than the threshold value, the process proceeds to step S504. When the battery remaining amount is equal to or larger than the threshold value, the process proceeds to step S510.

In step S504, the system controller 101 determines whether the eye approaching distance is larger than the threshold value Th1. When the eye approaching distance is larger than the threshold value Th1, the process proceeds to step S505. When the eye approaching distance is equal to or smaller than the threshold value Th1, the operation in step S504 is performed again.

In step S505, the system controller 101 starts time measurement using a timer controller 107.

In step S506, the system controller 101 determines whether the eye approaching distance is larger than the threshold value Th1 (that is, the eye approaching distance is still larger than the threshold value Th1 after step S504). When the eye approaching distance is larger than the threshold value Th1, the process proceeds to step S507. When the eye approaching distance is equal to or smaller than the threshold value Th1 (that is, the eye approaching distance becomes larger than the threshold value Th1 once but the distance is reduced to be equal to or smaller than the threshold value Th1 within 5 seconds), the process returns to step S503.

In step S507, the system controller 101 determines whether a measurement time measured by the timer controller 107 is larger than 5 seconds (that is, whether 5 seconds has elapsed after the eye approaching distance becomes larger than the threshold value Th1 in step S504). When the measurement time is larger than 5 seconds (that is, 5 seconds has elapsed), the process proceeds to step S508. When the measurement time is equal to or smaller than 5 seconds, the process returns to step S506.

In step S508, the system controller 101 turns off the display panel 105 so as to enter a non-display state. By this, power consumption, burn-in, and aging degradation may be suppressed.

In step S509, the system controller 101 determines whether a termination event, such as turning off of power, has been performed. When it is determined that the termination event has been performed, the process is terminated whereas when it is determined that the termination event has not been performed, the process returns to step S501 and the process from step S501 onwards is performed again. When the process is not to be terminated and when the eye approaching within the threshold value Th1 is detected again, the display panel 105 is turned on and display is performed again.

In step S510, the system controller 101 determines whether the eye approaching distance is larger than a threshold value Th2. When the eye approaching distance is larger than the threshold value Th2, the process proceeds to step S511. When the eye approaching distance is equal to or smaller than the threshold value Th2, the operation in step S510 is performed again.

In step S511, the system controller 101 starts time measurement using the timer controller 107.

In step S512, the system controller 101 determines whether the eye approaching distance is larger than the threshold value Th2 (that is, the eye approaching distance is still larger than the threshold value Th2 after step S510). When the eye approaching distance is larger than the threshold value Th2, the process proceeds to step S513. When the eye approaching distance is equal to or smaller than the threshold value Th2 (that is, the eye approaching distance becomes larger than the threshold value Th2 once but the distance is reduced to be equal to or smaller than the threshold value Th2 within 30 seconds), the process returns to step S503.

In step S513, the system controller 101 determines whether a measurement time measured by the timer controller 107 is larger than 30 seconds (that is, whether 30 seconds has elapsed after the eye approaching distance becomes larger than the threshold value Th2 in step S510). When the measurement time is larger than 30 seconds, the process proceeds to step S508 where the display panel 105 is turned off. When the measurement time is equal to or smaller than 30 seconds, the process returns to step S512.

As described above, according to this embodiment, by differentiating the eye approaching distances which cause turning off of the EVF 103 and differentiating the periods of time before the display panel 105 is turned off in accordance with the battery remaining amount, the EVF 103 is turned off earlier when the battery remaining amount is small so that power consumption is suppressed and a longer shooting time is attained.

More specifically, the threshold value (Th1) for the eye approaching distance in step S504 and the threshold value (Th2) for the eye approaching distance in step S510 are different from each other, that is, the threshold value Th1 is smaller than the threshold value Th2. In other words, the threshold value for the eye approaching distance in the case where the battery remaining amount is smaller than the predetermined value is smaller than that in the case where the battery remaining amount is equal to or larger than the predetermined value. Accordingly, in the case where the battery remaining amount is smaller than the predetermined value, the display panel 105 is turned off earlier when the eye is largely separated from the EVF 103 when compared with the case where the battery remaining amount is equal to or larger than the predetermined value.

Furthermore, a period of time from when the eye moves away from the EVF 103 to when the display panel 105 is turned off measured by the timer in the case where the battery remaining amount is smaller than the predetermined value, that is, 5 seconds, in step S507 and that in the case where the battery remaining amount is equal to or larger than the predetermined value, that is, 30 seconds, in step S513 are different from each other, that is, the period of time in the case where the battery remaining amount is smaller than the predetermined value is shorter.

Accordingly, in a case where the battery remaining amount is small, the display panel 105 is turned off earlier.

Note that, in this embodiment, the case where the threshold values (Th1 and Th2) of the eye approaching distance are differentiated and the timer times (5 seconds and 30 seconds) from when the eye approaching threshold value is exceeded to when the display panel 105 is turned off are differentiated has been described. However, only one of the two elements may be differentiated. Specifically, one of the threshold values of the eye approaching distance and the timer times may be differentiated so that the display panel 105 is turned off earlier in the case where the battery remaining amount is smaller and the other of the threshold values of the eye approaching distance and the timer times may be not differentiated.

The entire control of the apparatus performed by the system controller 101 may be performed by a single hardware portion or may be performed by a plurality of hardware portions.

Although the embodiments of the present invention have been described in detail, the present invention is not limited to the specific embodiments, and various modifications may be included in the present invention without departing from the scope of the invention. Furthermore, the foregoing embodiments are merely examples of the present invention, and the embodiments may be combined with each other where appropriate.

Furthermore, although the case where the present invention is applied to a video camera is described as an example in the foregoing embodiments, the present invention is not limited to this, and the present invention is applicable to any display control apparatus as long as the display control apparatus includes an eyepiece finder capable of detecting approach of an eye to an eye contacting portion. Specifically, the present invention is applicable to, for example, single-lens reflex cameras, digital still cameras having an electronic viewfinder or an optical viewfinder which includes a display unit displaying information, microscopes, telescopes, game machines, and head mounted displays.

According to the present invention, poor usability and uncomfortableness for the user in the display operation in the display unit included in the finder performed in accordance with an eye approaching operation and an eye separating operation of the user may be suppressed while power consumption is suppressed.

According to the foregoing embodiments, configurations described below are disclosed.

Embodiment 1. A display control apparatus comprising:
a viewfinder including an eye contacting portion and an internal display unit;
an eye approaching detection unit configured to detect a distance to an object approaching the eye contacting portion;
a mode switching unit configured to select one of a plurality of operation modes including first and second operation modes; and
a control unit configured to perform control such that
an on state of the internal display unit is changed to an off state based on detection, by the eye approaching detection unit, of an object which moves away from the eye contacting portion to a position at or further than a first distance from the eye contacting portion in the first operation mode, and
the on state of the internal display unit is changed to the off state based on detection, by the eye approaching detection unit, of an object which moves away from the eye contacting portion to a position at or further than a second distance, which is larger than the first distance, from the eye contacting portion in the second operation mode.

Embodiment 2. The display control apparatus according to claim 1, wherein
the control unit is configured to perform control such that time measurement is started in the on state of the internal display unit when the eye approaching detection unit detects that an object moves away from the eye contacting portion to a position at or further than the first distance from the eye contacting portion, and the internal display unit is turned off when a measured time exceeds a first time in the first operation mode, and
time measurement is started in the on state of the internal display unit when the eye approaching detection unit detects that an object moves away from the eye contacting portion to a position at or further than the second distance from the eye contacting portion, and the internal display unit is turned off when a measured time exceeds a second time which is longer than the first time in the second operation mode.

Embodiment 3. The display control apparatus according to embodiment 1, wherein the control unit is configured to perform control such that the off state of the internal display unit is changed to the on state when the eye approaching detection unit detects the object approached the eye contacting portion within a predetermined distance irrespective of the first and second operation modes.

Embodiment 4. The display control apparatus according to embodiment 3, wherein the predetermined distance corresponds to the first distance.

Embodiment 5. A display control apparatus comprising:
a viewfinder including an eye contacting portion and an internal display unit;
an eye approaching detection unit configured to detect approach of an object to the eye contacting portion;
a mode switching unit configured to select one of a plurality of operation modes including first and second operation modes; and
a control unit configured to perform control such that
an on state of the internal display unit is changed to an off state when a first time has elapsed after the eye approaching detection unit does not detect the object in the vicinity of the eye contacting portion any more in the first operation mode, and
the on state of the internal display unit is changed to the off state when a second time which is longer than the first time has elapsed after the eye approaching detection unit does not detect the object in the vicinity of the eye contacting portion any more in the second operation mode.

Embodiment 6. The display control apparatus according to embodiment 5, wherein
the control unit is configured to perform control such that the off state of the internal display unit is changed to the on state when the eye approaching detection unit detects approach of the object to the eye contacting portion irrespective of the first and second operation modes.

Embodiment 7. The display control apparatus according to embodiment 5, wherein the first operation mode is a reproducing mode for reproducing an image.

Embodiment 8. The display control apparatus according to embodiment 5, wherein the second operation mode is a recording mode for recording a captured moving image.

Embodiment 9. A display control apparatus comprising:
a viewfinder including an eye contacting portion and an internal display unit;
an eye approaching detection unit configured to detect a distance to an object approaching the eye contacting portion;
a remaining amount detection unit configured to detect a battery remaining amount; and
a control unit configured to perform control such that
in a case where the battery remaining amount detected by the remaining amount detection unit is smaller than a predetermined value, an on state of the internal display unit is changed to an off state when the eye approaching detection unit detects that an object moves away from the eye contacting portion to a position at or further than a first distance from the eye contacting portion, and
in a case where the battery remaining amount detected by the remaining amount detection unit is equal to or larger than the predetermined value, the on state of the internal display unit is changed to the off state when the eye approaching detection unit detects that the object moves away from the eye contacting portion to a position at or further than a second distance, which is larger than the first distance, from the eye contacting portion.

Embodiment 10. The display control apparatus according to embodiment 9, wherein the control unit is configured to perform control such that in the case where the battery remaining amount is smaller than the predetermined value, time measurement is started in the on state of the internal display unit when the eye approaching detection unit detects that an object moves away from the eye contacting portion to a position at or further than the first distance from the eye contacting portion, and the internal display unit is turned off when a measured time exceeds a first time, and in the case where the battery remaining amount is equal to or larger than the predetermined value, time measurement is started in the on state of the internal display unit when the eye approaching detection unit detects that an object moves away from the eye contacting portion to a position at or further than the second distance from the eye contacting portion, and the internal display unit is turned off when a measured time exceeds a second time which is longer than the first time.

Embodiment 11. The display control apparatus according to embodiment 9, wherein the control unit is configured to perform control such that the off state of the internal display unit is changed to the on state when the eye approaching detection unit detects that the object which has approached the eye contacting portion approaches the eye contacting portion within a predetermined distance irrespective of a result of a determination whether the battery remaining amount is equal to or larger than the predetermined value.

Embodiment 12. The display control apparatus according to embodiment 11, wherein the predetermined distance corresponds to the first distance.

Embodiment 13. A display control apparatus comprising:

a viewfinder including an eye contacting portion and an internal display unit;

an eye approaching detection unit configured to detect approach of an object to the eye contacting portion;

a remaining amount detection unit configured to detect a battery remaining amount; and a control unit configured to perform control such that in a case where the battery remaining amount detected by the remaining amount detection unit is smaller than a predetermined value, an on state of the internal display unit is changed to an off state when a first time has elapsed after the eye approaching detection unit does not detect the object in the vicinity of the eye contacting portion any more, and in a case where the battery remaining amount detected by the remaining amount detection unit is equal to or larger than the predetermined value, the on state of the internal display unit is changed to the off state when a second time which is longer than the first time has elapsed after the eye approaching detection unit does not detect the object in the vicinity of the eye contacting portion any more.

Embodiment 14. The display control apparatus according to embodiment 13, wherein the control unit performs control such that the off state of the internal display unit is changed to the on state when the eye approaching detection unit detects approach of the object to the eye contacting portion irrespective of a result of a determination as to whether the battery remaining amount is equal to or larger than the predetermined value.

Embodiment 15. The display control apparatus according to embodiment 5, further comprising:

an imaging unit, wherein the internal display unit is capable of displaying an image captured by the imaging unit.

Embodiment 16. A method for controlling a display control apparatus including a viewfinder including an eye contacting portion and an internal display unit, an eye approaching detection unit configured to detect a distance to an object approaching the eye contacting portion, and a mode switching unit configured to select one of a plurality of operation modes including first and second operation modes, the method comprising:

performing control such that an on state of the internal display unit is changed to an off state based on detection, by the eye approaching detection unit, of an object which moves away from the eye contacting portion to a position at or further than a first distance from the eye contacting portion in the first operation mode; and performing control such that the on state of the internal display unit is changed to the off state based on detection, by the eye approaching detection unit, of the object which moves away from the eye contacting portion to a position at or further than a second distance, which is larger than the first distance, from the eye contacting portion in the second operation mode.

Embodiment 17. A method for controlling a display control apparatus including a viewfinder including an eye contacting portion and an internal display unit, an eye approaching detection unit configured to detect approach of an object to the eye contacting portion, and a mode switching unit configured to select one of a plurality of operation modes including first and second operation modes, the method comprising:

performing control such that an on state of the internal display unit is changed to an off state when a first time has elapsed after the eye approaching detection unit does not detect the object in the vicinity of the eye contacting portion any more in the first operation mode; and performing control such that the on state of the internal display unit is changed to the off state when a second time which is longer than the first time has elapsed after the eye approaching detection unit does not detect the object in the vicinity of the eye contacting portion any more in the second operation mode.

Embodiment 18. A method for controlling a display control apparatus including a viewfinder including an eye contacting portion and an internal display unit, an eye approaching detection unit configured to detect a distance to an object approaching the eye contacting portion, and a remaining amount detection unit configured to detect a battery remaining amount, the method comprising:

performing control such that, in a case where the battery remaining amount detected by the remaining amount detection unit is smaller than a predetermined value, an on state of the internal display unit is changed to an off state based on detection, by the eye approaching detection unit, of an object which moves away from the eye contacting portion to a position at or further than a first distance from the eye contacting portion; and performing control such that, in a case where the battery remaining amount detected by the remaining amount detection unit is equal to or larger than the predetermined value, the on state of the internal display unit is changed to the off state based on detection, by the eye approaching detection unit, of an object which moves away from the eye contacting portion to a position at or further than a second distance, which is larger than the first distance from the eye contacting portion.

Embodiment 19. A method for controlling a display control apparatus including a viewfinder including an eye contacting portion and an internal display unit, an eye approaching detection unit configured to detect approach of an object to the eye contacting portion, and a remaining amount detection unit configured to detect a battery remaining amount, the method comprising:

performing control such that, in a case where the battery remaining amount detected by the remaining amount detection unit is smaller than a predetermined value, an on state of the internal display unit is changed to an off state when a first time has elapsed after the eye approaching detection unit does not detect the object in the vicinity of the eye contacting portion any more; and performing control such that, in a case where the battery remaining amount detected by the remaining amount detection unit is equal to or larger than the predetermined value, the on state of the internal display unit is changed to the off state when a second time which is longer than the first time has elapsed after the eye approaching detection unit does not detect the object in the vicinity of the eye contacting portion any more.

Embodiment 20. A computer-readable non-transitory storage medium storing a program that causes a computer of a display control apparatus including a viewfinder including an eye contacting portion and an internal display unit, an eye approaching detection unit configured to detect a distance to an object approaching the eye contacting portion, and a mode switching unit configured to select one of a plurality of operation modes including first and second operation modes to execute:

performing control such that an on state of the internal display unit is changed to an off state based on detection, by the eye approaching detection unit, of an object which moves away from the eye contacting portion to a position at or further than a first distance from the eye contacting portion in the first operation mode; and performing control such that the on state of the internal display unit is changed to the off state based on detection, by the eye approaching detection unit, of an object which moves away from the eye contacting portion to a position at or further than a second distance, which is larger than the first distance, from the eye contacting portion in the second operation mode.

Embodiment 21. A computer-readable non-transitory storage medium storing a program that causes a computer of a display control apparatus including a viewfinder including an eye contacting portion and an internal display unit, an eye approaching detection unit configured to detect approach of an object to the eye contacting portion, and a mode switching unit configured to select one of a plurality of operation modes including first and second operation modes to execute:

performing control such that an on state of the internal display unit is changed to an off state when a first time has elapsed after the eye approaching detection unit does not detect the object in the vicinity of the eye contacting portion any more in the first operation mode; and performing control such that the on state of the internal display unit is changed to the off state when a second time which is longer than the first time has elapsed after the eye approaching detection unit does not detect the object in the vicinity of the eye contacting portion any more in the second operation mode.

Embodiment 22. A computer-readable non-transitory storage medium storing a program that causes a computer of a display control apparatus including a viewfinder including an eye contacting portion and an internal display unit, an eye approaching detection unit configured to detect a distance to an object approaching the eye contacting portion, and a remaining amount detection unit configured to detect a battery remaining amount to execute:

performing control such that, in a case where the battery remaining amount detected by the remaining amount detection unit is smaller than a predetermined value, an on state of the internal display unit is changed to an off state based on detection, by the eye approaching detection unit, of an object which moves away from the eye contacting portion to a position at or further than a first distance from the eye contacting portion; and performing control such that, in a case where the battery remaining amount detected by the remaining amount detection unit is equal to or larger than the predetermined value, the on state of the internal display unit is changed to the off state based on detection, by the eye approaching detection unit, of an object which moves away from the eye contacting portion to a position at or further than a second distance, which is larger than the first distance, from the eye contacting portion.

Embodiment 23. A computer-readable non-transitory storage medium storing a program that causes a computer of a display control apparatus including a viewfinder including an eye contacting portion and an internal display unit, an eye approaching detection unit configured to detect approach of an object to the eye contacting portion, and a remaining amount detection unit configured to detect a battery remaining amount to execute:

performing control such that, in a case where the battery remaining amount detected by the remaining amount detection unit is smaller than a predetermined value, an on state of the internal display unit is changed to an off state when a first time has elapsed after the eye approaching detection unit does not detect the object in the vicinity of the eye contacting portion any more; and performing control such that, in a case where the battery remaining amount detected by the remaining amount detection unit is equal to or larger than the predetermined value, the on state of the internal display unit is changed to the off state when a second time which is longer than the first time has elapsed after the eye approaching detection unit does not detect the object in the vicinity of the eye contacting portion any more.

Embodiment(s) of the present invention can also be realized by a computer of a system or apparatus that reads out and executes computer executable instructions (e.g., one or more programs) recorded on a storage medium (which may also be referred to more fully as a 'nontransitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2015-017291, filed Jan. 30, 2015, which is hereby incorporated by reference herein in its entirety.

What is claimed is:

1. A display control apparatus comprising:
a viewfinder including an eye contacting portion and an internal display unit;
an eye approaching detection unit configured to detect a distance to an object approaching the eye contacting portion;
a mode switching unit configured to select one of a plurality of operation modes including first and second operation modes; and
a control unit configured to perform control such that
an on state of the internal display unit is changed to an off state based on detection, by the eye approaching detection unit, of an object which moves away from the eye contacting portion to a position at or further than a first distance from the eye contacting portion in the first operation mode, and
the on state of the internal display unit is changed to the off state based on detection, by the eye approaching detection unit, of an object which moves away from the eye contacting portion to a position at or further than a second distance, which is larger than the first distance, from the eye contacting portion in the second operation mode.

2. The display control apparatus according to claim 1, wherein
the control unit is configured to perform control such that
time measurement is started in the on state of the internal display unit when the eye approaching detection unit detects that an object moves away from the eye contacting portion to a position at or further than the first distance from the eye contacting portion, and the internal display unit is turned off when a measured time exceeds a first time in the first operation mode, and
time measurement is started in the on state of the internal display unit when the eye approaching detection unit detects that an object moves away from the eye contacting portion to a position at or further than the second distance from the eye contacting portion, and the internal display unit is turned off when a measured time exceeds a second time which is longer than the first time in the second operation mode.

3. The display control apparatus according to claim 1, wherein
the control unit is configured to perform control such that
the off state of the internal display unit is changed to the on state when the eye approaching detection unit detects the object approached the eye contacting portion within a predetermined distance irrespective of the first and second operation modes.

4. The display control apparatus according to claim 3, wherein the predetermined distance corresponds to the first distance.

5. A display control apparatus comprising:
a viewfinder including an eye contacting portion and an internal display unit;
an eye approaching detection unit configured to detect approach of an object to the eye contacting portion;
a mode switching unit configured to select one of a plurality of operation modes including first and second operation modes; and
a control unit configured to perform control such that
an on state of the internal display unit is changed to an off state when a first time has elapsed after the eye approaching detection unit does not detect the object in the vicinity of the eye contacting portion any more in the first operation mode, and
the on state of the internal display unit is changed to the off state when a second time which is longer than the first time has elapsed after the eye approaching detection unit does not detect the object in the vicinity of the eye contacting portion any more in the second operation mode.

6. The display control apparatus according to claim 5, wherein
the control unit is configured to perform control such that
the off state of the internal display unit is changed to the on state when the eye approaching detection unit detects approach of the object to the eye contacting portion irrespective of the first and second operation modes.

7. The display control apparatus according to claim 5, wherein the first operation mode is a reproducing mode for reproducing an image.

8. The display control apparatus according to claim 5, wherein the second operation mode is a recording mode for recording a captured moving image.

9. A display control apparatus comprising:
a viewfinder including an eye contacting portion and an internal display unit;
an eye approaching detection unit configured to detect a distance to an object approaching the eye contacting portion;
a remaining amount detection unit configured to detect a battery remaining amount; and
a control unit configured to perform control such that
in a case where the battery remaining amount detected by the remaining amount detection unit is smaller than a predetermined value, an on state of the internal display unit is changed to an off state when the eye approaching detection unit detects that an object moves away from the eye contacting portion to a position at or further than a first distance from the eye contacting portion, and
in a case where the battery remaining amount detected by the remaining amount detection unit is equal to or larger than the predetermined value, the on state of the internal display unit is changed to the off state when the eye approaching detection unit detects that the object moves away from the eye contacting portion to a position at or further than a second distance, which is larger than the first distance, from the eye contacting portion.

10. The display control apparatus according to claim 9, wherein
  the control unit is configured to perform control such that
    in the case where the battery remaining amount is smaller than the predetermined value, time measurement is started in the on state of the internal display unit when the eye approaching detection unit detects that an object moves away from the eye contacting portion to a position at or further than the first distance from the eye contacting portion, and the internal display unit is turned off when a measured time exceeds a first time, and
    in the case where the battery remaining amount is equal to or larger than the predetermined value, time measurement is started in the on state of the internal display unit when the eye approaching detection unit detects that an object moves away from the eye contacting portion to a position at or further than the second distance from the eye contacting portion, and the internal display unit is turned off when a measured time exceeds a second time which is longer than the first time.

11. The display control apparatus according to claim 9, wherein
  the control unit is configured to perform control such that the off state of the internal display unit is changed to the on state when the eye approaching detection unit detects that the object which has approached the eye contacting portion approaches the eye contacting portion within a predetermined distance irrespective of a result of a determination whether the battery remaining amount is equal to or larger than the predetermined value.

12. The display control apparatus according to claim 11, wherein the predetermined distance corresponds to the first distance.

13. A display control apparatus comprising:
  a viewfinder including an eye contacting portion and an internal display unit;
  an eye approaching detection unit configured to detect approach of an object to the eye contacting portion;
  a remaining amount detection unit configured to detect a battery remaining amount; and
  a control unit configured to perform control such that
    in a case where the battery remaining amount detected by the remaining amount detection unit is smaller than a predetermined value, an on state of the internal display unit is changed to an off state when a first time has elapsed after the eye approaching detection unit does not detect the object in the vicinity of the eye contacting portion any more, and
    in a case where the battery remaining amount detected by the remaining amount detection unit is equal to or larger than the predetermined value, the on state of the internal display unit is changed to the off state when a second time which is longer than the first time has elapsed after the eye approaching detection unit does not detect the object in the vicinity of the eye contacting portion any more.

14. The display control apparatus according to claim 13, wherein
  the control unit performs control such that the off state of the internal display unit is changed to the on state when the eye approaching detection unit detects approach of the object to the eye contacting portion irrespective of a result of a determination as to whether the battery remaining amount is equal to or larger than the predetermined value.

15. The display control apparatus according to claim 5, further comprising:
  an imaging unit,
  wherein the internal display unit is capable of displaying an image captured by the imaging unit.

16. A method for controlling a display control apparatus including a viewfinder including an eye contacting portion and an internal display unit, an eye approaching detection unit configured to detect a distance to an object approaching the eye contacting portion, and a mode switching unit configured to select one of a plurality of operation modes including first and second operation modes, the method comprising:
  performing control such that an on state of the internal display unit is changed to an off state based on detection, by the eye approaching detection unit, of an object which moves away from the eye contacting portion to a position at or further than a first distance from the eye contacting portion in the first operation mode; and
  performing control such that the on state of the internal display unit is changed to the off state based on detection, by the eye approaching detection unit, of the object which moves away from the eye contacting portion to a position at or further than a second distance, which is larger than the first distance, from the eye contacting portion in the second operation mode.

17. A method for controlling a display control apparatus including a viewfinder including an eye contacting portion and an internal display unit, an eye approaching detection unit configured to detect approach of an object to the eye contacting portion, and a mode switching unit configured to select one of a plurality of operation modes including first and second operation modes, the method comprising:
  performing control such that an on state of the internal display unit is changed to an off state when a first time has elapsed after the eye approaching detection unit does not detect the object in the vicinity of the eye contacting portion any more in the first operation mode; and
  performing control such that the on state of the internal display unit is changed to the off state when a second time which is longer than the first time has elapsed after the eye approaching detection unit does not detect the object in the vicinity of the eye contacting portion any more in the second operation mode.

18. A method for controlling a display control apparatus including a viewfinder including an eye contacting portion and an internal display unit, an eye approaching detection unit configured to detect a distance to an object approaching the eye contacting portion, and a remaining amount detection unit configured to detect a battery remaining amount, the method comprising:
  performing control such that, in a case where the battery remaining amount detected by the remaining amount detection unit is smaller than a predetermined value, an on state of the internal display unit is changed to an off state based on detection, by the eye approaching detection unit, of an object which moves away from the eye contacting portion to a position at or further than a first distance from the eye contacting portion; and
  performing control such that, in a case where the battery remaining amount detected by the remaining amount detection unit is equal to or larger than the predetermined value, the on state of the internal display unit is changed to the off state based on detection, by the eye approaching detection unit, of an object which moves away from the eye contacting portion to a position at or further than a second distance, which is larger than the first distance from the eye contacting portion.

19. A method for controlling a display control apparatus including a viewfinder including an eye contacting portion and an internal display unit, an eye approaching detection unit configured to detect approach of an object to the eye contacting portion, and a remaining amount detection unit configured to detect a battery remaining amount, the method comprising:
performing control such that, in a case where the battery remaining amount detected by the remaining amount detection unit is smaller than a predetermined value, an on state of the internal display unit is changed to an off state when a first time has elapsed after the eye approaching detection unit does not detect the object in the vicinity of the eye contacting portion any more; and
performing control such that, in a case where the battery remaining amount detected by the remaining amount detection unit is equal to or larger than the predetermined value, the on state of the internal display unit is changed to the off state when a second time which is longer than the first time has elapsed after the eye approaching detection unit does not detect the object in the vicinity of the eye contacting portion any more.

20. A computer-readable non-transitory storage medium storing a program that causes a computer of a display control apparatus including a viewfinder including an eye contacting portion and an internal display unit, an eye approaching detection unit configured to detect a distance to an object approaching the eye contacting portion, and a mode switching unit configured to select one of a plurality of operation modes including first and second operation modes to execute:
performing control such that an on state of the internal display unit is changed to an off state based on detection, by the eye approaching detection unit, of an object which moves away from the eye contacting portion to a position at or further than a first distance from the eye contacting portion in the first operation mode; and
performing control such that the on state of the internal display unit is changed to the off state based on detection, by the eye approaching detection unit, of an object which moves away from the eye contacting portion to a position at or further than a second distance, which is larger than the first distance, from the eye contacting portion in the second operation mode.

21. A computer-readable non-transitory storage medium storing a program that causes a computer of a display control apparatus including a viewfinder including an eye contacting portion and an internal display unit, an eye approaching detection unit configured to detect approach of an object to the eye contacting portion, and a mode switching unit configured to select one of a plurality of operation modes including first and second operation modes to execute:
performing control such that an on state of the internal display unit is changed to an off state when a first time has elapsed after the eye approaching detection unit does not detect the object in the vicinity of the eye contacting portion any more in the first operation mode; and
performing control such that the on state of the internal display unit is changed to the off state when a second time which is longer than the first time has elapsed after the eye approaching detection unit does not detect the object in the vicinity of the eye contacting portion any more in the second operation mode.

22. A computer-readable non-transitory storage medium storing a program that causes a computer of a display control apparatus including a viewfinder including an eye contacting portion and an internal display unit, an eye approaching detection unit configured to detect a distance to an object approaching the eye contacting portion, and a remaining amount detection unit configured to detect a battery remaining amount to execute:
performing control such that, in a case where the battery remaining amount detected by the remaining amount detection unit is smaller than a predetermined value, an on state of the internal display unit is changed to an off state based on detection, by the eye approaching detection unit, of an object which moves away from the eye contacting portion to a position at or further than a first distance from the eye contacting portion; and
performing control such that, in a case where the battery remaining amount detected by the remaining amount detection unit is equal to or larger than the predetermined value, the on state of the internal display unit is changed to the off state based on detection, by the eye approaching detection unit, of an object which moves away from the eye contacting portion to a position at or further than a second distance, which is larger than the first distance, from the eye contacting portion.

23. A computer-readable non-transitory storage medium storing a program that causes a computer of a display control apparatus including a viewfinder including an eye contacting portion and an internal display unit, an eye approaching detection unit configured to detect approach of an object to the eye contacting portion, and a remaining amount detection unit configured to detect a battery remaining amount to execute:
performing control such that, in a case where the battery remaining amount detected by the remaining amount detection unit is smaller than a predetermined value, an on state of the internal display unit is changed to an off state when a first time has elapsed after the eye approaching detection unit does not detect the object in the vicinity of the eye contacting portion any more; and
performing control such that, in a case where the battery remaining amount detected by the remaining amount detection unit is equal to or larger than the predetermined value, the on state of the internal display unit is changed to the off state when a second time which is longer than the first time has elapsed after the eye approaching detection unit does not detect the object in the vicinity of the eye contacting portion any more.

* * * * *